March 5, 1940.　　T. T. WOODSON　　2,192,764
VARIABLE CAPACITOR
Filed May 5, 1938
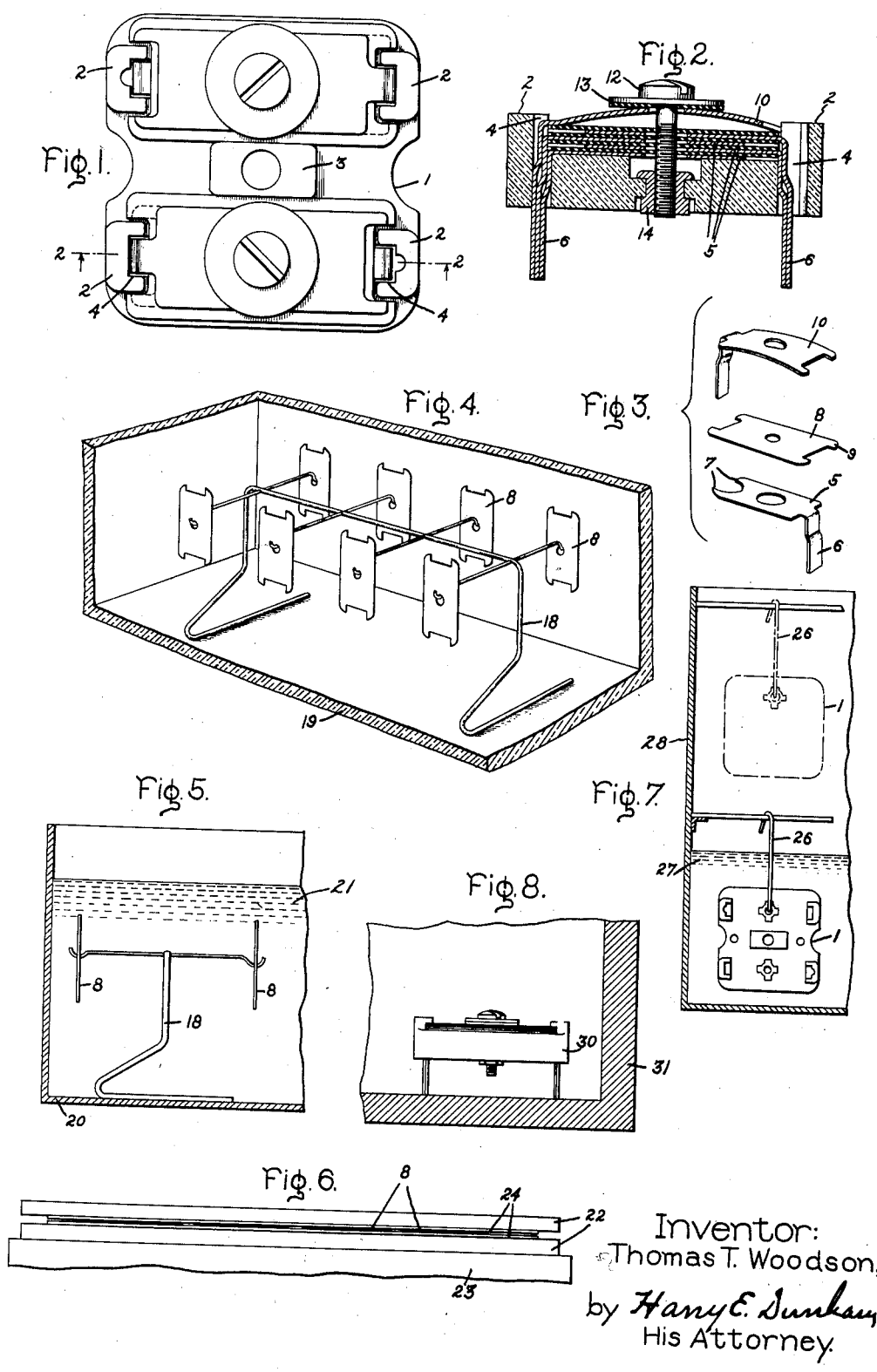
Inventor:
Thomas T. Woodson,
by Harry E. Dunlap
His Attorney.

Patented Mar. 5, 1940

2,192,764

UNITED STATES PATENT OFFICE 2,192,764

VARIABLE CAPACITOR

Thomas T. Woodson, Schenectady, N. Y., assignor to General Electric Company, a corporation of New York Application May 5, 1938, Serial No. 206,157

5 Claims. (Cl. 175—41.5)

My invention relates to variable capacitors of the type which comprises a plurality of superposed conducting and dielectric plates, a change in the amount of capacitance provided thereby being effected by varying the pressure applied to the plates. Capacitors of this type are commonly employed as "trimmers" in radio or other high frequency circuits and an example of such a capacitor is that disclosed in the Sickles Patent 2,031,910.

In certain circuits where capacitors of this type are employed it is essential for the proper functioning of other apparatus in the circuit that the capacitance after being adjusted to the desired value shall remain unchanged notwithstanding ordinary variations in temperature and humidity such as may be due to changes in the weather, etc. Tests have shown that capacitors of the type mentioned above and as disclosed in the aforesaid Sickles patent undergo a surprisingly large change in capacitance incident to the change in the relative humidity of the ambient air from one day to another. For example, it has been found that a capacitor having a capacitance of 200 mmf. on a dry day has had its capacitance changed to 210 mmf. on a damp day, showing thereby an increase in capacitance of 10 mmf. or approximately 5 % merely by reason of the change in the relative humidity of the air. For many uses capacitors which are affected to such an extent by variations in the weather are not objectionable; for others, however, such, for example, as in the circuits of automatically tuned radio receiving sets they cannot be tolerated.

The object of my invention, therefore, is the provision of an improved capacitor and process of manufacturing it whereby the objections pointed out above are largely, if not entirely, avoided.

My invention will be better understood from the following description taken in connection with the accompanying drawing and its scope will be pointed out in the appended claims.

Referring to the drawing, Fig. 1 is a plan view drawn to an enlarged scale of an embodiment of my invention; Fig. 2 is a cross sectional view of the same taken on line 2—2 of Fig. 1; Fig. 3 is an exploded view of the metal and dielectric plates of the capacitor; Fig. 4 illustrates the step of initially drying the dielectric plates; Fig. 5 illustrates the step of treating the dielectric plates in hot insulating material; Fig. 6 illustrates the step of removing the surplus material from the dielectric plates; Fig. 7 illustrates the steps of treating the bases and of removing the surplus insulating material therefrom, and Fig. 8 illustrates the step of heat treating the complete assembly while it is firmly compressed.

The capacitor illustrated by Figs. 1, 2 and 3 is similar in appearance to the capacitor disclosed by the aforesaid Sickles patent. As in that patent, it is shown having a double construction comprising a two-part base each part of which supports a separate capacitor unit. As my invention, however, is not dependent upon the double construction, I shall limit the description to follow to that of the base and one capacitor unit.

The base 1, which is constructed of suitable material such, for example, as a ceramic, is provided with the spaced lugs 2 and the intermediate mounting lug 3. Adjacent to each lug 2 the base is provided with the opening 4 through which extends one terminal of the capacitor. Mounted on the base are the metallic plates 5 each having a terminal lug, shown at 6, at one end and a cut away portion at the other forming the ears 7 which by interengaging with a lug 2 on the base position the plate. Interleaved with the metallic plates 5 are the dielectric plates 8 which preferably are composed of mica. Each sheet 8 has ears 9 formed on both ends thereof which by interengaging with the lugs 2 on the base serve to position these plates. The top plate 10 is shown curved having an upward bow and preferably, although not necessarily, is made of somewhat heavier material than the plates 5. The adjusting screw 12 which has the insulating washer 13 under its head passes through openings in the several plates and is threaded into the metal insert 14 mounted in the lower portion of the base. Thus, by turning the screw to the right or left the degree to which the plates of the capacitor are compressed is varied and hence the amount of capacitance provided by the capacitor is changed. It will be noted that although the plates 5 are made from flat material and the mica plates 8 are naturally flat, these plates are not so exactly flat but that small spaces exist between them when they are piled up one on top of another. When pressure is applied to the pile however as by turning down the adjusting screw the top plate 10 will not only be made more flat but the small spaces between the other plates will be diminished, thus varying the capacitance of the capacitor through the desired range.

As I have already pointed out above, a capacitor as so constructed is subject to an objectionable variation in capacitance due to changes in humidity of the surrounding air. I have found that this variation in capacitance may be prevented to a large extent if, before assembly the metallic and mica plates on the bases, the mica plates be treated in a hot, insulating, non-hygroscopic, adhesive material. Such a material may, for example, be a blend of synthetic carnauba and other mineral waxes, which is known to the trade as "Zophar 1340 Wax."

Unless the plates are already quite free from moisture, I have found that improved results may be obtained by carefully drying the plates before they are treated with hot wax. In Fig. 4, I have illustrated the step of initially drying the mica plates where a number of the plates are shown individually supported on the rack 18 in the oven 19. By supporting the plates individually in the drying oven each plate becomes thoroughly dried throughout in a minimum time. I have obtained good results by thus drying the mica plates at an oven temperature of 250° F. for approximately two hours. At the end of the drying period the plates are transferred by lifting the rack 18 holding them out of the heating oven and immediately immersing the rack with the plates still supported thereon in the tank 20 containing the above-mentioned hot wax 21. The plates being individually exposed on all sides to the hot wax become thoroughly impregnated therewith. I have obtained good results by treating the mica plates in such wax maintained at a temperature of approximately 300° F. for approximately one hour.

With a capacitor such as that disclosed above and constructed with mica sheets treated in the above-described manner, greatly improved results were obtained since the wax by filling all of the crevices or interstices in the mica plates sealed the plates against the entrance of moisture. Notwithstanding these improved results the capacitor was not entirely satisfactory for it was found that as time progressed the capacitance of the capacitor slowly changed even though the humidity of the air remained unchanged. This change in capacitance appeared to be due to the gradual flow of the surplus wax on the surface of the mica plates due to the compression produced by the adjusting screw whereby the spacing of the metal plates was allowed to decrease slightly.

I overcame this difficulty without sacrificing the advantage of using mica plates impregnated with the insulating wax by removing the surplus wax from the surfaces of the mica plates. The method which I employ for removing this surplus wax is illustrated by Fig. 6. In this figure the hot plates 22 are shown supported on the stove 23 and between the hot plates are the two layers 24 of hot dry absorbent paper between which the impregnated mica plates 8 are placed. The stove 23 is maintained at a temperature above the melting point of the wax 21. By thus blotting the surplus wax on the faces of the mica plates the plates are entirely freed therefrom since it is readily taken up by the absorbent paper. A capacitor built up of metal plates alternating with mica plates treated as described above and put under compression has been found not only to have its capacitance remain unchanged when changes occur in the humidity of the air but to remain constant as time progresses showing that there is no flow of wax on the surfaces of the mica plates which flow would allow the spacing of the metal plates to change.

Inasmuch as a certain amount of moisture from the air is taken up by the base of the capacitor which moisture affects the capacitance provided by the capacitor, I have further improved my capacitor by treating the base in a hot, insulating, non-hygroscopic, adhesive material, which for example may be the paraffin base wax which is known to the trade as "Cerese AA Wax." In Fig. 7, I have illustrated the step of treating a base in such a material and of subsequently removing the surplus therefrom. The base is shown hung by the hook 26 so as to be immersed in the hot wax 27 in the bottom of the tank 28. I have obtained good results by treating the bases in such wax maintained at a temperature of approximately 300° F. for approximately two hours. At the expiration of that time I lift the base and hang it suspended above the level of the wax in the tank as shown by the dot and dash lines in Fig. 7. Since the wax which clings to the base when it is lifted to its new position is very thin, it drains off readily leaving the base substantially entirely free from surplus wax on its surface and also leaving all holes and cavities in the base free of wax. If, perchance, any holes remain filled with liquid wax upon removing the base from the wax bath 27, the holes may be blown clear of wax by a blast of air. The base is thereafter removed from its draining position in the tank 28 and the metallic and mica plates are then mounted thereon with the adjusting screw in position.

In certain cases I may take an additional precaution to insure against any change in the capacitance of the capacitor either by reason of a change in the humidity or as a result of any flow of wax on the dielectric plates or on the base. For that purpose, I tighten down the adjusting screw firmly to clamp together the various plates against the base and while in that clamped position I give the complete capacitor a further heat treatment. This additional step of the process is illustrated by Fig. 8 where the complete capacitor 30 is shown being baked within the oven 31. I have obtained good results from thus baking the capacitor at a temperature of approximately 250° F. for approximately one hour. After this baking process is completed I remove the capacitor, cool it slowly and then loosen the adjusting screw.

What I claim as new and desire to secure by Letters Patent of the United States is:

1. In the process of manufacturing a variable capacitor wherein interleaved dielectric and metal plates are maintained under compression, the steps which comprise immersing the dielectric plates individually in a hot, insulating, non-hygroscopic, adhesive material, removing the surplus material adhering to each plate and piling up said plates alternately with the metal plates.

2. In the process of manufacturing a variable capacitor wherein interleaved dielectric and metal plates are maintained under compression, the steps which comprise immersing the dielectric plates individually in a hot, insulating, non-hygroscopic, adhesive material, applying an absorbent to remove the surplus material adhering to each plate and piling up said plates alternately with the metal plates.

3. In the process of manufacturing a variable capacitor wherein interleaved dielectric and metal plates are maintained under compression, the steps which comprise immersing the dielectric plates individually in a hot, insulating, non-hygroscopic, adhesive material, pressing each dielectric plate between hot absorbent sheets to remove the surplus material adhering thereto and piling up said plates alternately with the metal plates.

4. A variable capacitor having a dielectric plate between two metal plates and adjustable means for variably pressing together said plates to vary the capacitance, said dielectric plate having an insulating, non-hygroscopic, adhesive material filling the crevices therein and having its surface devoid of a surplus of said material whereby changes in the setting of said adjustable means produces changes in capacitance of the capacitor and the capacitance remains fixed after each setting of the adjustable means.

5. A variable capacitor comprising a base, a plurality of interleaved dielectric and metal plates, a pressure plate and an adjusting screw arranged to variably compress said interleaved plates between the pressure plate and the base, said dielectric plates being impregnated with an insulating, non-hygroscopic, adhesive material and having their faces devoid of a surplus of said material whereby changes in the adjustment of said screw varies the capacitance of the capacitor and no change in capacitance occurs between settings of the adjusting screw.

THOMAS T. WOODSON.